(12) United States Patent
Prock et al.

(10) Patent No.: US 8,509,196 B1
(45) Date of Patent: Aug. 13, 2013

(54) METHOD AND SYSTEM FOR ALLOCATING POWER AMONG CONCURRENT TRANSMISSION ATTEMPTS

(75) Inventors: John W. Prock, Peculiar, MO (US); Anoop K. Goyal, Overland Park, KS (US); Bhagwan Khanka, Lenexa, KS (US); Hemanth B. Pawar, Herndon, VA (US); Shilpa Kowdley Srivinas, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 959 days.

(21) Appl. No.: 12/547,942

(22) Filed: Aug. 26, 2009

(51) Int. Cl.
*H04W 4/00* (2009.01)
*H04W 72/00* (2009.01)
*H04B 7/216* (2006.01)

(52) U.S. Cl.
USPC ........... 370/336; 370/329; 370/338; 370/342; 370/465; 455/452.2

(58) Field of Classification Search
None
See application file for complete search history.

(56) References Cited

U.S. PATENT DOCUMENTS

| | | | |
|---|---|---|---|
| 5,884,170 A | 3/1999 | Valentine et al. | |
| 6,088,589 A | 7/2000 | Valentine et al. | |
| 6,208,624 B1 | 3/2001 | Tanno et al. | |
| 6,272,352 B1 | 8/2001 | Cerwall et al. | |
| 6,856,789 B2 | 2/2005 | Pattabiraman et al. | |
| 6,963,750 B1 | 11/2005 | Cheng et al. | |
| 7,047,050 B1 | 5/2006 | Khawand et al. | |
| 7,076,258 B2 | 7/2006 | Motegi et al. | |
| 7,149,535 B1 | 12/2006 | Chaturvedi et al. | |
| 2006/0198344 A1 | 9/2006 | Teague et al. | |
| 2007/0149235 A1* | 6/2007 | Chin et al. | 455/522 |
| 2009/0311963 A1* | 12/2009 | Haverty | 455/63.1 |
| 2011/0201361 A1* | 8/2011 | Montojo et al. | 455/458 |

OTHER PUBLICATIONS

U.S. Appl. No. 11/772,466, filed Jul. 2, 2007.
U.S. Appl. No. 12/115,226, filed May 5, 2008.

* cited by examiner

*Primary Examiner* — Kevin C Harper
*Assistant Examiner* — Samina Choudhry

(57) ABSTRACT

Disclosed is a method and system for allocating power among concurrent transmission attempts from a radio access network (RAN). In practice, the RAN encounters a situation where the RAN is going to engage concurrently in at least a transmission attempt of a first message and a transmission attempt of a second message. The RAN then determines an attempt number of the first transmission attempt and an attempt number of the second transmission attempt. The RAN then compares the determined attempt numbers and, based on the comparison, allocated a limited quantity of transmission power among the first transmission attempt and the second transmission attempt. For instance, based the comparison a greater portion of the transmission power may be allocated to one of the transmission attempts and a correspondingly lesser portion of the transmission power may be allocated to the other transmission attempt.

15 Claims, 3 Drawing Sheets

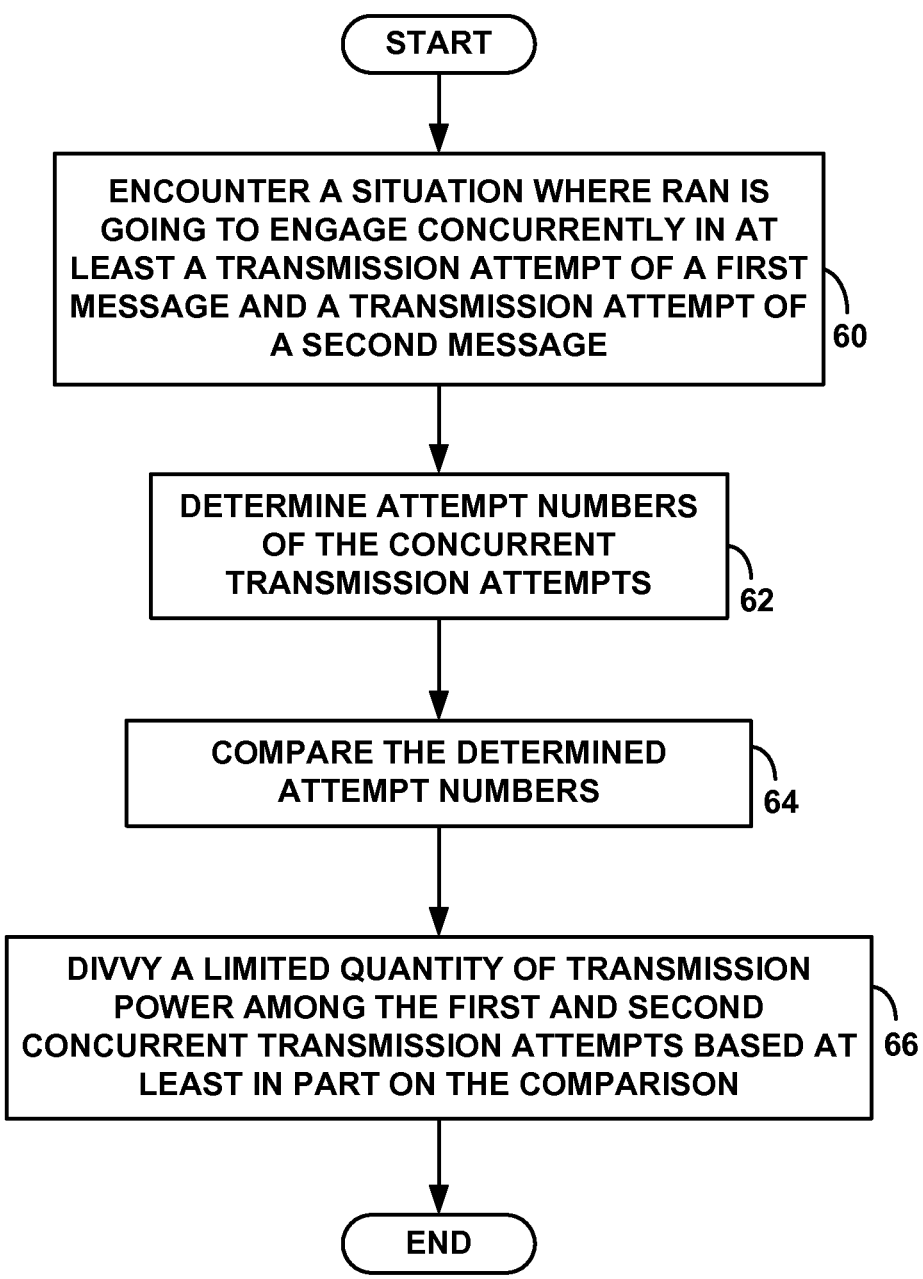

METHOD AND SYSTEM FOR ALLOCATING POWER AMONG CONCURRENT TRANSMISSION ATTEMPTS

BACKGROUND

The use of access terminals such as cellular telephones, personal digital assistants, pagers, or portable computers has become an increasingly popular means of communicating with others, accessing information, conducting business, and performing myriad other activities. Access terminals typically communicate with radio access networks (RANs). These access terminals and RANs typically communicate with each other over a radio frequency (RF) air interface using any of a number of communication protocols, such as evolution data optimized (EV-DO), WiMax, code division multiple access (CDMA), and/or other protocols.

In a typical RAN, an area is divided geographically into a number of cells and sectors, each defined by a RF radiation pattern from a respective base station in the RAN. Within each sector (or cell), the base station's RF radiation pattern provides the RF air interface over which access terminals may communicate with the RAN. In turn, the RAN may communicate with one or more other networks, such as the Public Switched Telephone Network (PSTN) or the Internet. As such, when an access terminal is positioned within a coverage area of the RAN (e.g., in a given sector or cell), the access terminal can communicate with entities on the other networks via the RAN.

The RF air interface of any given sector (or cell) in the RAN is typically divided into a plurality of channels for carrying communications between access terminals and the RAN. For example, the RF air interface may include a plurality of forward-link channels, such as pilot channels, sync channels, paging channels, and forward-traffic channels, for carrying communications from the RAN to access terminals. As another example, the RF air interface may include a plurality of reverse-link channels, such as access channels and reverse-traffic channels, for carrying communications from the access terminals to the RAN. Depending on the wireless technology used, the air interface can be divided into these channels through code division multiplexing (with each channel defined by modulation with one or more specific codes), time division multiplexing (with each channel defined as one or more recurring segments of time), frequency division multiplexing (with each channel defined by modulation with one or more specific frequencies), and/or some other mechanism.

OVERVIEW

When the RAN seeks to transmit a message (e.g., a page message or any other type of message) via an air interface to an access terminal served by the RAN, the RAN typically engages in a sequence of transmission attempts until the RAN completes the sequence or until the RAN receives an acknowledgement message from the access terminal. For instance, when seeking to page an access terminal, the RAN may engage in a first transmission attempt by transmitting a page message over an air interface paging channel for receipt by the access terminal. If the RAN does not receive an acknowledgement in response from the access terminal within a defined time period, the RAN may then engage in a second (i.e., a next) transmission attempt by again transmitting the page message over the air interface paging channel for receipt by the access terminal. And once again, if the RAN does not receive an acknowledgement in response from the access terminal within a defined time period, the RAN may then engage in a third (i.e., next) transmission attempt. This process may continue until the RAN has engaged in a predefined number of transmission attempts defining the sequence or, by definition, until the RAN receives an acknowledgement from the access terminal.

In some implementations, a RAN may have a particular level of transmission power that the RAN devotes to transmissions on certain channels in a coverage area. For instance, the RAN may have a fixed or maximum level of transmission power that the RAN devotes to paging channel transmissions. This devoted level of transmission power may be a portion of the total transmission power available for use in the coverage area. For instance, the RAN may have a power amplifier that defines a maximum level of transmission power for the coverage area as a whole, and the RAN may be set to use a particular portion of that transmission power for transmissions on paging channels defined in the coverage area. Thus, for example, when the RAN has a page message to transmit to an access terminal on a paging channel, the RAN may transmit that page message at the power level defined for paging channel transmissions in the coverage area.

At times, however, a situation can arise where the RAN seeks to transmit two messages concurrently. For instance, the RAN may encounter a situation where the RAN is going to concurrently transmit a given page message on one paging channel in the coverage area (e.g., to a particular access terminal) and another page message on another paging channel in the coverage area (e.g., to another access terminal). If the RAN is arranged to use a particular level of transmission power cumulatively for such channels, at issue is then how the RAN should allocate that transmission power among the concurrent transmissions. (Note that the "concurrent" transmission scenario can be when the RAN seeks to transmit the messages at exactly the same moment in time. Alternatively, the "concurrent" transmission scenario can be any situation where the transmissions would compete for available transmission power, even if not at exactly the same moment in time.)

Disclosed herein is a method and corresponding system to help address this issue. According to the method, the RAN will allocate transmission power among the competing transmissions based on a comparison of the transmission attempt numbers of the transmissions. In particular, the RAN will determine for each of the competing transmissions what attempt number the transmission is in a sequence of transmission attempts, and the RAN will compare those attempts numbers and then allocate the available transmission power among the competing transmissions based on the comparison. In this regard, a first transmission attempt of a particular message (e.g., a page message) may be considered to be attempt number one, a next transmission attempt of the particular message may be considered to be attempt number two, and so forth. Thus, the comparison by the RAN may show that one of the competing transmissions has a particular attempt number in its transmission sequence and that another competing transmission has a given attempt number in its transmission sequence. Based on a comparison of those attempt numbers, the RAN may then allocate the available transmission power among the competing transmissions (i.e., among the competing transmission attempts).

Preferably, the limited transmission power will be allocated completely among the competing transmissions. For instance, if there are two competing transmissions and X units of power, the decision may be to allocate ¼ of X to one of the transmissions while allocating ¾ of X to the other transmission. Thus, the result is to allocate the limited quantity of transmission power, rather than to merely increase or decrease transmission power for a given transmission.

In one implementation of this method, the RAN may be set to allocate a greater portion of the transmission limited power to a later transmission attempt than to a concurrent earlier transmission attempt. For instance, if the RAN encounters a situation where the RAN is going to concurrently engage in a transmission attempt A of a given message and a transmission attempt B of another message, if the RAN determines that the attempt number of transmission attempt A is greater than the attempt number of transmission attempt B, then the RAN may automatically allocate more of the limited transmission power to transmission attempt A and less of the limited transmission power to transmission attempt B.

In another implementation of this method, the RAN may be set to allocate a greater portion of the limited transmission power to an earlier transmission attempt than to a concurrent later transmission attempt. For instance, if the RAN encounters a situation where the RAN is going to concurrently engage in a transmission attempt A of a given message and a transmission attempt B of another message, if the RAN determines that the attempt number of transmission attempt A is greater than the attempt number of transmission attempt B, then the RAN may automatically allocate more of the limited transmission power to transmission attempt B and less of the limited transmission power to transmission attempt A.

In a RAN where transmission power is set dynamically per air interface channel and where the concurrent transmissions are occurring on respective air interface channels, the RAN can implement the method by dynamically adjusting the per-channel power for the message transmissions. For instance, consider a coverage area that has two paging channels and that has a defined total transmission power to be used cumulatively for the paging channels. In normal operation, half of that transmission power may be devoted to one of the channels and the other half of that transmission power may be devoted to the other channel. In accordance with the present method, however, if the RAN encounters a scenario where the RAN is going to concurrently engage in transmission of a page message on one of those channels and a transmission of another page message on the other of those channels, the RAN may compare the transmission attempt numbers of those page message transmissions and, based on that comparison, allocate the total transmission power to the channels for those transmissions. For instance, if the RAN determines that the transmission attempt number of the page message transmission on a first paging channel is greater than the transmission attempt number of the page message transmission on a second channel, the RAN may allocate a greater portion of the total transmission power to the first paging channel for the transmission on that channel, and the RAN may allocate a lesser portion of the total transmission power to the second paging channel for the transmission on that channel. After completing the concurrent transmissions at these allocated power levels, the RAN may then revert to equally dividing the total transmission power among the channels.

Accordingly, in one respect, disclosed is an improved RAN that allocates a quantity of transmission power among concurrent transmission attempts. When the RAN is going to engage concurrently in at least a first transmission attempt of a first message and a second transmission attempt of a second message, (i) the RAN determines an attempt number of the first transmission attempt and an attempt number of the second transmission attempt, (ii) the RAN performs a comparison of the determined attempt numbers, and (iii) based at least in part on the comparison, the RAN allocates a quantity of transmission power among the first transmission attempt and the second transmission attempt.

In another respect, disclosed is a method for allocating power among concurrent transmission attempts. In accordance with the method, (i) the RAN encounters a situation where the RAN is going to engage concurrently in at least a transmission attempt of a first message and a transmission attempt of a second message, (ii) the RAN determines an attempt number of the first transmission attempt and an attempt number of the second transmission attempt, (iii) the RAN performs a comparison of the determined attempt numbers, (iv) the RAN allocates a quantity of transmission power among the first transmission attempt and the second transmission attempt based at least in part on the comparison.

And in another respect, disclosed is a method for allocating power to channels operating in a given wireless coverage area. In accordance with the method, (i) the RAN identifies a first transmission attempt number associated with a first message, wherein the first message is assigned to a first channel for transmission and wherein the first transmission attempt number is indicative of a number of sequential attempts by a radio access network (RAN) to transmit the first message, (ii) the RAN identifies a second transmission attempt number associated with a second message, wherein the second message is assigned to a second channel for transmission, and wherein the second transmission attempt number is indicative of a number of sequential attempts by the RAN to transmit the second message, (iii) the RAN compares the first and second transmission attempt numbers, (iv) and the RAN allocates a quantity of transmit power to each the first and second channels based at least in part on the comparison, wherein the first and second channels share a total amount of power dedicated to at least one channel operating in a wireless coverage area of the RAN.

These as well as other aspects, advantages and alternatives will become apparent to those of ordinary skill in the art by reading the following detailed description with reference where appropriate to the accompanying drawings.

BRIEF DESCRIPTION OF THE DRAWINGS

FIG. 3 is a flow chart depicting functions that can be carried out in accordance with an exemplary embodiment of the method.

DETAILED DESCRIPTION

Figure 1:
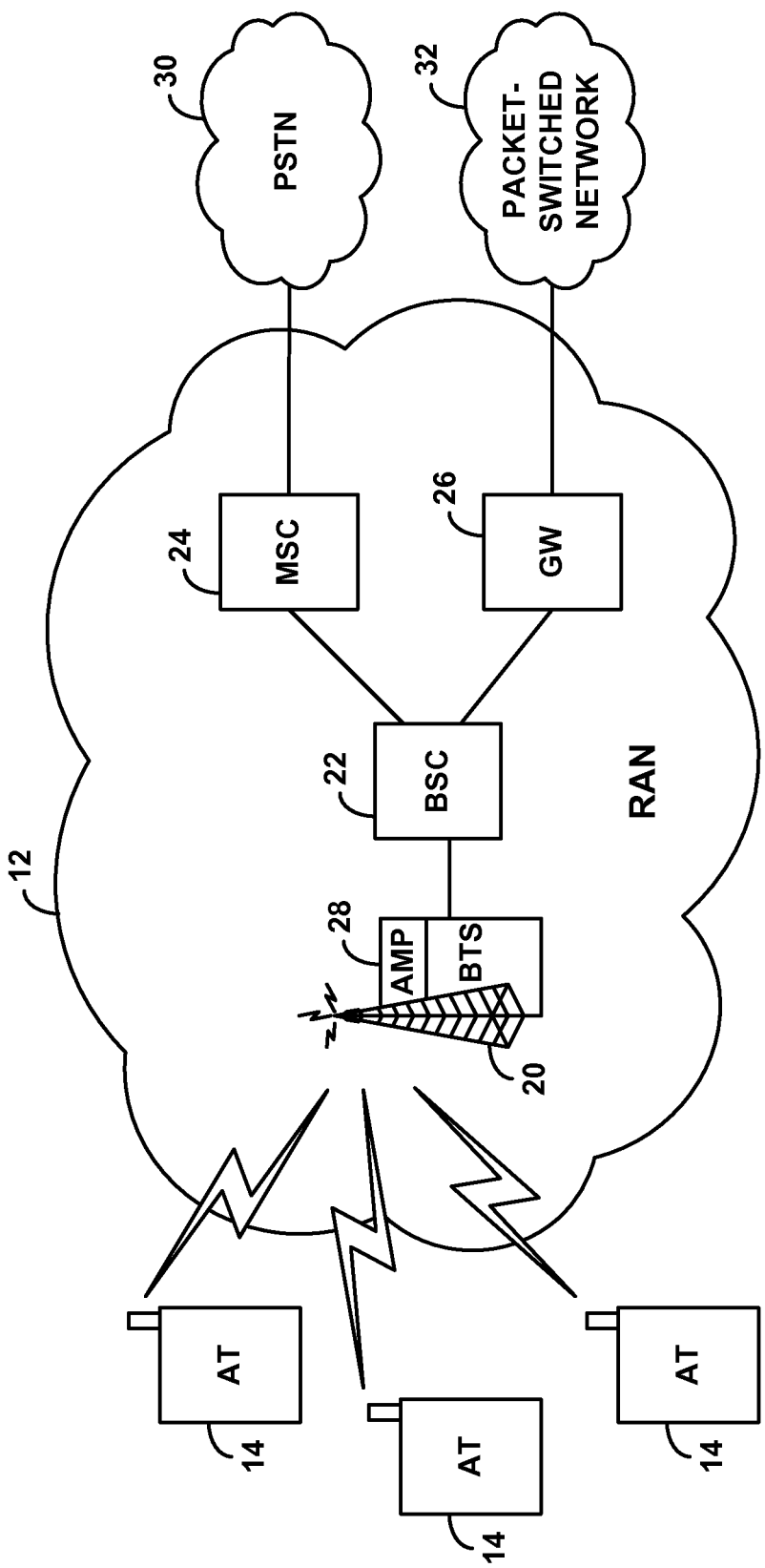
FIG. 1 is a simplified block diagram of a communication system in which an exemplary embodiment of the method and system can be implemented.

Referring to the drawings, as noted above, FIG. 1 is a simplified block diagram of a communication system in which the exemplary method can be implemented. It should be understood, of course, that this and other arrangements and functions described herein (including in the overview section above) are provided by way of example only and that numerous variations may be possible. For instance, structural and functional elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions). Still further, the term "exemplary" as used herein should be understood to mean "serving as an example, instance, or illustration."

The system of FIG. 1 includes at its core a radio access network (RAN) 12 that is arranged to serve one or more access terminals (ATs) 14 via an air interface 16 (or multiple air interfaces 16). The system, including RAN 12, access terminals 14, and air interface 16, may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, access terminals 14 may be any wireless communication devices that are capable of wirelessly communicating with RAN 12 and, in particular, any wireless communication devices that are capable of receiving and processing transmissions from RAN 12. While the present method is generally applicable with respect to various types transmissions, the method will be described by way of example (and without any intended limitation) with respect to page message transmissions. Thus, the exemplary access terminals 14 are preferably devices capable of receiving and processing page message transmissions from RAN 12. Examples of such access terminals 14 include cellular telephones, wirelessly-equipped PDAs, wirelessly equipped personal computers, and wirelessly equipped appliances or devices of other sorts, now known or later developed.

RAN 12, in turn, may be any wireless serving network that is capable of communicating over an air interface with one or more access terminals, such as access terminals 14 for instance, and particularly such a network that is capable of sending paging channel messages, such as call setup page messages, message waiting indicators, data burst messages, or other sort of page messages now known or later developed, to access terminals. As such, the RAN will include one or more antennas, one or more transceivers, and associated control logic for engaging in air interface communication with access terminals according to any agreed air interface protocol. Further, the RAN will preferably include a variable power amplifier that facilitates transmitting of air interface communications at desired power levels.

As discussed above, the air interface in a given coverage area will preferably be divided into a number of forward link channels, through any agreed mechanism such as code division multiplexing for instance. For instance, the air interface may define at least two paging channels on which the RAN can send page messages to served access terminals. Preferably, the variable power amplifier for the coverage area at issue will be programmatically controllable such that RAN 12 can set the transmission power on a per channel basis and can vary the transmission power from time to time as desired.

The RAN 12 may connect with one or more transport networks and signaling networks and may include logic to set up and carry communications between entities on the network(s) and served access terminals. For instance, the RAN may include a network interface and program logic to receive a call setup message seeking to set up a call to a particular access terminal, and the RAN may responsively page the access terminal via the air interface 16 and ultimately set up a communication path over the air to the access terminal. Likewise, the RAN may respond to a request from the access terminal to place an outbound call to a particular entity, and the RAN may set up the call to the particular entity. Further, the RAN may receive a data over signaling message, such as a short message service (SMS) message or message waiting indicator (MWI), destined to a particular access terminal, and the RAN may transmit the message via an air interface paging channel to the access terminal. And the RAN may similarly receive a data over signaling message, such as an outbound SMS message or MWI acknowledgement, from the access terminal and transmit the message to a destination entity.

Without limitation, FIG. 1 depicts an example configuration of RAN 12. As shown, the example RAN includes a base station 20, a base station controller (BSC) 22, a mobile switching center (MSC) 24, and a packet data gateway (GW) 26. In other arrangements, it should be understood that the RAN may take different forms, ranging from a single element (e.g., a wireless access point router) to other more complex forms, with various different elements.

Base station 20 preferably includes an antenna tower (or other antenna structure) and associated equipment, including a programmable processor for instance, arranged to communicate over air interface 16 with one or more served access terminals 14. The base station 20 antenna and associated equipment may be arranged to define a cell and various cell sectors in which access terminals can operate. Further, the base station 20 preferably includes, possibly for each sector, a power amplifier 28 such as a tower-top amplifier for instance, which is arranged to amplify RF signals for transmission over air interface 16 to access terminals. Preferably, the power amplifier 28 has a variable gain that can be set by an appropriate control signal or other logic. Variable gain power amplifiers are well known in the art and are therefore not described in detail here. Further, suitable variable gain power amplifiers may be developed in the future and may be applied as well.

BSC 22 is coupled with and functions to control one or more base stations such as base station 20, so as to manage aspects of base station and air interface operation. For instance, BSC 22 may manage handoff of access terminals moving between base station coverage areas, and to schedule air interface transmissions of data or other bearer or control traffic via base stations to or from various access terminals. Further, BSC 22 may programmatically control the power of transmissions over the air interface, such as by directing base station 20 to increase or decrease the gain of its power amplifier or to set the gain at a specific level for instance. Depending on the wireless protocol used, aspects of the base station 20 and BSC 22 may be combined together or distributed in other ways, generally defining a base station system or more generally a "base station".

MSC 24, in turn, is coupled with and functions to control one or more BSCs, such as BSC 22 for instance. For instance, MSC 24 may manage handoff of access terminals moving between BSC coverage areas, and to direct BSC 22 to take various actions such as paging particular access terminals. In a RAN where an MSC is provided, the MSC may generally control operation of the RAN, including possibly controlling the power level of air interface transmissions by appropriately signaling to a serving access terminal or directing BSC 22 to effect such power control. Alternatively, the BSC (sometimes referred to as a radio network controller (RNC)) may generally control operation of the RAN.

As shown, the MSC 24 is conventionally connected with the public switched telephone network (PSTN) 30, so as to enable suitably equipped access terminals (e.g., cellular telephones) to engage in telephone calls or other PSTN communications with entities on the PSTN.

In example operation, when a call is placed to an access terminal, the MSC 24 may receive a communication that triggers paging of the access terminal. For instance, the MSC 24 may receive an Integrated Services Digital Network User Part (ISUP) Initial Address Message (IAM) or other communication that signifies the call and identifies the access terminal. The MSC 24 may then send a paging request to the BSC 22. In turn, the BSC may direct the base station 20 to send a page message over the air interface 16 in an effort to locate the called access terminal. If the access terminal is located the coverage area of the RAN and receives the page message, the access terminal may then send a page response or acknowledgement message over the air to the RAN. If the RAN does not receive an acknowledgement from the access terminal (e.g., due to the access terminal not being present or an acknowledgement from the access terminal not making it successfully to the RAN), the RAN may engage in a next transmission attempt of the page message, and the RAN may continue to do so until the RAN completes a page attempt sequence or until the access terminal responds. Upon receipt of an acknowledgement from the access terminal, the BSC 22 may direct the base station to send to the access terminal a channel assignment message that contains identifying information for a traffic channel, and the MSC 24 may connect the call through to the access terminal.

GW 26, in turn, is conventionally connected with a packet-switched network 32, such as the Internet or a wireless carrier's core transport network for instance. GW 26 may function as a network access server such as a packet data serving node (PDSN), to provide connectivity between circuit-switched communications with access terminals and packet-switched communications on network 32. Further or alternatively, GW 26 may function as a media gateway (MGW) and may carry out functions that would otherwise be carried out by MSC 24. GW 26 may also function as a Mobile-IP (MIP) foreign agent and/or home agent for access terminals arranged to engage in MIP communication via network 36, in a manner well known in the art.

BSC 22 and GW 26 may work together to enable suitably equipped access terminals 14 to engage in packet-data communications, such as voice over IP (VoIP) communications, on network 32. In practice, for instance, an access terminal may initially work with the RAN to establish packet-data connectivity in accordance with any agreed protocol. When packet-data is transmitted to an access terminal, GW 26 and/or BSC 22 may receive the data as communication that triggers paging of the access terminal. GW 26 may, for instance, pass the data along to BSC 22 and instruct the BSC to page the access terminal, and BSC 22 may then direct the base station 20 to send a page message over the air interface 16 in an effort to locate the access terminal. If the access terminal is located the coverage area of the RAN and receives the page message, the access terminal may then send a page response message (e.g., a connection request message) over the air to the RAN. Alternatively, if the RAN does not receive a response from the access terminal, then the RAN may engage in a next transmission attempt of the page message, and the RAN may continue to do so until the RAN completes a page attempt sequence or until the access terminal responds. Upon receipt of a response from the access terminal, the BSC 22 may direct the base station to send to the access terminal a traffic channel assignment message that contains identifying information for a traffic channel, and the BSC may then transmit the packet data via that traffic channel to the access terminal.

Each of the components of RAN 12, including base station 20, BSC 22, MSC 24 and GW 26, preferably includes a processor (i.e., one or more processors), data storage, and program instructions stored in the data storage and executable by the processor to carry out various functions described herein. Alternatively or additionally, these or other RAN components may include other forms of logic, such as firmware and/or hardware logic, to carry out various functions described.

As explained above, the present method provides for allocating a limited quantity of transmission power among two or more concurrent transmissions on an air interface, and the example method is specifically directed to allocating a limited quantity of transmission power among two or more concurrent page message transmissions. In the context of FIG. 1, a given coverage area (e.g., sector) defined by base station 20 may for instance have two or more paging channels, which would be used for transmitting page messages to served access terminals. In practice, base station 20 may receive from BSC 22 (e.g., ultimately from MSC 24) page messages that are destined for receipt by particular access terminals, and base station 20 may queue those messages for transmission on particular paging channels. The selection of paging channel to use for a particular page message may be based on a hash algorithm keyed to the destination access terminal's identifier, and the access terminal may apply the same hash algorithm and thus monitor the proper paging channel.

In usual practice, the base station 20 would execute a scheduling algorithm that determines which page messages are to be transmitted at which times. For instance, given a queue of page messages to be transmitted on a given paging channel, the scheduling algorithm may dictate that the base station sort the page messages in order of priority so that higher priority page messages get transmitted before lower priority page messages. Through this or another scheduling process or merely by chance of when the base station receives page messages to transmit (or generates page messages to transmit), the base station may encounter a situation where at least two page messages are to be transmitted concurrently, such as when one page message is to be transmitted on one paging channel at the same time as another page message is to be transmitted on another paging channel.

The assumption in this situation is that the base station has a limited quantity of transmission power that the base station needs to allocate among these concurrent transmissions. For instance, while power amplifier 28 may provide an overall maximum transmission power for the coverage area as a whole, base station 20 may be set to use just a certain portion of that transmission power for paging channel transmissions, so as to preserve sufficient power for transmissions on other channels such as traffic channels. Given such a power limitation, the present method provides for allocating the limited transmission power among the concurrent transmissions based on a comparison of transmission attempt numbers of the transmissions, where "attempt number" defines which attempt the transmission is in a sequence of attempts for the message at issue, and where a greater attempt number defines a later attempt in the sequence.

In a preferred implementation, this method is carried out at the base station itself, since the base station preferably has control over its power amplifier 28, and the base station is preferably the entity that schedules transmission of various page messages and will thus be able to (i) detect when the base station is going to concurrently transmit two or more page messages, (ii) determine and compare the transmission attempt numbers of the page message transmissions, and (iii) allocate a limited quantity of transmission power among the concurrent page message transmissions based on the comparison.

In an alternative embodiment, however, aspects of the method can be implemented by other components in RAN 12. For instance, a processor at MSC 24 or BSC 22 could in some manner be aware of the scheduling of transmission attempts and could function to detect a concurrent transmission scenario, to compare the transmission attempt numbers, and to decide based on the comparison what portion of the limited transmission power should be allocated to one of the competing transmissions and what portion of the limited transmission power should be allocated to the other one of the competing transmissions. The processor could then output a directive that would be transmitted or otherwise provided to the base station 20 or specifically to the power amplifier 28, to cause the limited quantity of transmission power to be allocated accordingly.

Figure 2:
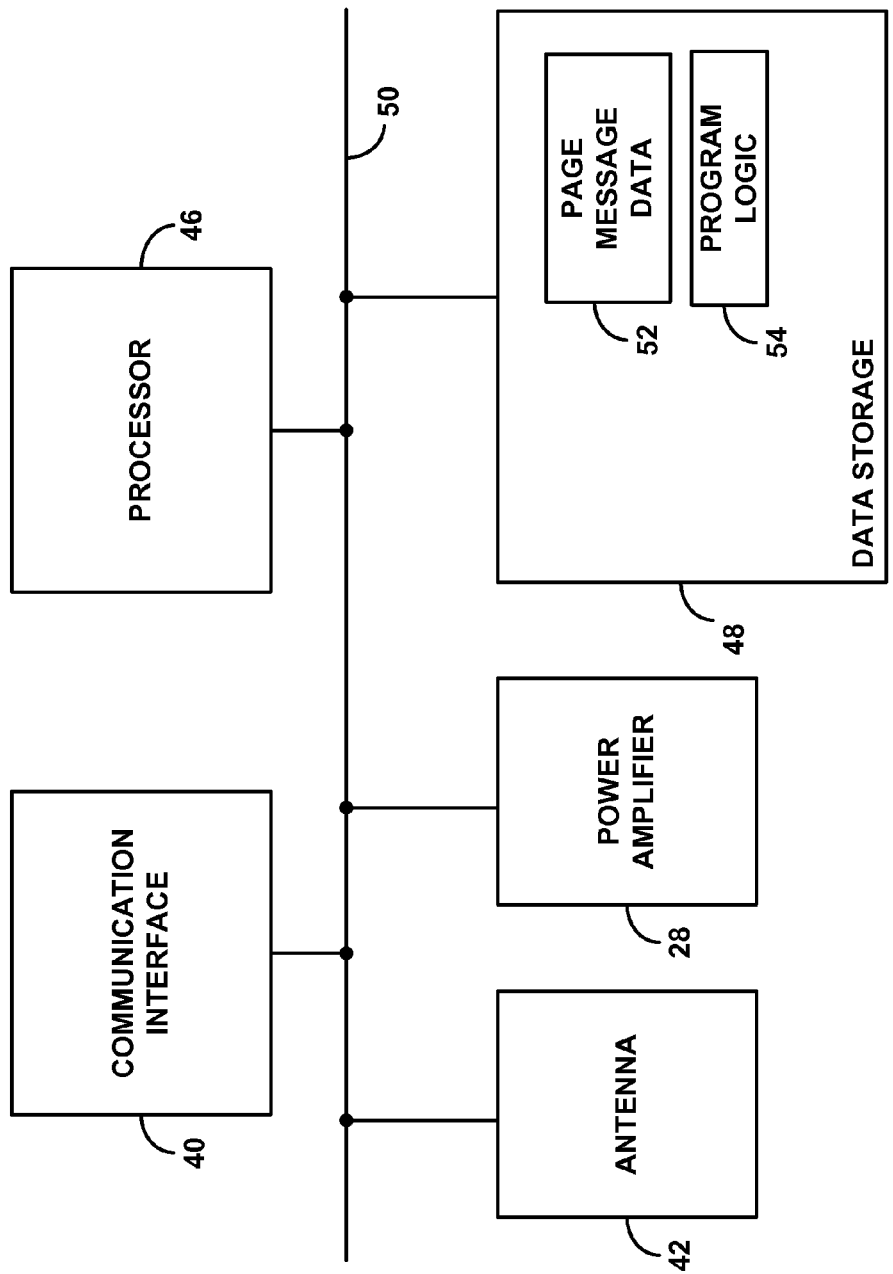
FIG. 2 is a simplified block diagram depicting functional components of a RAN operable to carry out aspects of the present method.

FIG. 2 is a simplified block diagram depicting various components arranged to implement the method in practice. In particular, the figure depicts a communication interface 40, an antenna 42, power amplifier 28, a processor 46, and data storage 48, all of which may be coupled together by a system bus, network, or other connection mechanism 50.

Communication interface 40 may be a network interface through which to receive page messages for transmission over the air. At base station 20, for instance, communication interface may be a T1 interface through which the base station 20 communicates with BSC 22, and thus through which the base station receives page messages provided by BSC 22 (e.g., ultimately by MSC 24) for transmission over the air to particular access terminals.

Antenna 42 may comprise a base station antenna structure of a type well known in the art, for engaging in air interface communication. Preferably, the antenna 44 is positioned at the top of antenna tower in a manner well known in the art. Power amplifier 28 is then a variable gain power amplifier as discussed above, preferably configured to be able to receive power control commands to control transmission power on various air interface channels at various times.

Processor 46 may comprise one or more general purpose processors (e.g., INTEL microprocessors) and/or one or more special purpose processors (e.g., digital signal processors). And data storage 48 may then comprise one or more volatile and/or non-volatile storage components, such as magnetic, optical, or organic storage and may be integrated in whole or in part with processor 46. As shown, data storage 48 contains page message data 52, such as queues of page messages to be transmitted over the air on various paging channels, and information about page transmission attempts. Further, data storage 48 contains program logic 54, which is executable by processor 46 to carry out various functions, such as scheduling transmission of page messages, detecting a situation when two or more page messages are going to be transmitted concurrently, comparing transmission attempt numbers of the page messages, and directing power amplifier 28 to apply particular channel transmission power levels so as to allocate a limited quantity of paging channel transmission power among the competing page message transmissions in accordance with the comparison.

FIG. 3 is next a flow chart depicting functions that can be carried out in accordance with the exemplary method, to allocate transmission power among concurrent transmission attempts. The transmission power at issue may be the overall quantity of transmission power dedicated for transmissions on at least one air interface channel, such as the overall quantity of transmission power dedicated for transmissions on the paging channels of a given coverage areas. The concurrent transmissions may be concurrent transmissions on different channels or may be concurrent transmissions on a common channel if feasible.

As shown in FIG. 3, at block 60, the method thus involves the RAN encountering a situation where the RAN is going to engage concurrently in at least a first transmission attempt of a first message and a second transmission attempt of a second message. (In this regard, the terms "first" and "second" should not be read to connote any order or place in attempt sequence but are rather intended to be labels, akin to "A" and "B".) The RAN may encounter this situation in many different ways.

In one example, RAN 118 may encounter this situation when base station 20 is going to engage concurrently in a first transmission attempt of a first message and a second transmission attempt of a second message (i.e., that the RAN is going to engage or scheduled to engage in a concurrent transmission attempt of at least two different messages). For instance, where two paging channels of a coverage area are synchronized in time and have synchronized timeslots, the RAN may determine that the two messages are scheduled for transmission in a common timeslot or are going to be scheduled for transmission in a common timeslot. This function may occur as the messages are about to be transmitted or may occur while the messages are queued for transmission, with a known time to transmission.

At block 62, when the RAN is going to engage concurrently in the first transmission attempt of first message and the second of the second message, the RAN will respond to that situation by determining an attempt number of the first transmission attempt and an attempt number of the second transmission attempt.

In practice, the first and second messages may each include data indicative of their respective attempt numbers. For instance, the first message may include first data (e.g., in a header portion of the first message) specifying or otherwise indicative of the attempt number of the first transmission attempt and second message may include second data (e.g., in a header portion of the second message) specifying or otherwise indicative of the attempt number of the second transmission attempt. Thus, in one example, the RAN may determine the attempt number of the first transmission attempt by parsing the first message and reading the attempt number from a message header. Likewise, the RAN may determine the attempt number of the second transmission attempt by parsing the second message and reading the attempt number from a message header.

Alternatively, the act of determining the attempt number of either or each message may involve querying stored data that indicates the attempt number. For instance, base station 20 may keep track of message transmission attempts and, through use of unique sequence identification data in each message or in some other manner, may thus determine where a given message transmission falls within a sequence. More particularly, each time the base station transmits a message, the base station may record the message transmission attempt in data storage. When the base station is to transmit a given message, the base station may then refer to its data storage to determine if the same message was transmitted already and if so how many times, so that the base station can thereby determine which attempt number the current transmission is in the attempt sequence.

At block 64, the RAN then performs a comparison of the determined attempt numbers, and at block 66, the RAN allocates a limited quantity of transmission power among the competing first and second transmission attempts in a manner based on the comparison.

In practice, the RAN may allocate the limited quantity of transmission power among the transmission attempts by allocating specific quantity of transmission power to each of the transmission attempts. For example, if the RAN determines from the comparison that the attempt number of the first transmission attempt is greater than the attempt number of the second transmission attempt, then the RAN may allocate a greater portion of the transmission power to the first transmission attempt and, correspondingly, a lesser portion of the transmission power to the second transmission attempt. As another example, if the RAN determines from the comparison that the attempt number of the first transmission attempt is less than the attempt number of the second transmission attempt, then the RAN may allocated a greater portion of the transmission power to the second transmission attempt and, correspondingly, a lesser portion of the transmission power to the first transmission attempt. And as another example, if the RAN determines from the comparison that the attempt number of the first transmission attempt is equal to the attempt number of the second transmission attempt, then the RAN may allocate equal portions of the limited transmission power to the first and second transmission attempts.

In a scenario where the first transmission attempt is set to occur on a first air interface channel and the second transmission attempt is set to occur on a second air interface channel, the act of allocating the limited quantity of transmission power among the concurrent transmission attempts may be understood to involve assigning respective transmission powers to the respective air interface channels for the time of the concurrent transmission. For example, if the attempt number of the first transmission attempt is greater than the attempt number of the second transmission attempt, then, for the time of the concurrent transmission, the RAN may allocate more of the transmission power to the first channel and correspondingly less of the transmission power to the second channel. As another example, if the attempt number of the first transmission attempt is less than the attempt number of the second transmission attempt, then, for the time of the concurrent transmission, the RAN may allocate less of the transmission power to first channel and correspondingly more of the transmission power to the second channel. And as yet another example, if the attempt number of the first transmission attempt is equal to the attempt number of the second transmission attempt, then, for the time of the concurrent transmission, the RAN may allocate equal portions of the transmission power to the first and second channels.

After the RAN has allocated the limited quantity of transmission power among the first and second transmission attempts, the RAN may then engage in the transmission attempts at power levels according to the allocating. In particular, through processor-provided directives, power amplifier 28 would concurrently transmit the first transmission attempt at the power level allocated for transmission of the first transmission attempt and the second transmission attempt at the power level allocated for transmission of the second transmission attempt. As noted above, this may occur during a common timeslot on two air interface channels for instance.

In practice, the method depicted in FIG. 3 can be implemented in a system where the first message is assigned to be transmitted on a first channel and the second message is assigned to be transmitted on a second channel, perhaps using a hashing algorithm as noted above. The two channels can be defined to operate in a given wireless coverage area of the RAN, such as in a given cell or cell sector, and the two channels may be forward link physical channels, such as paging channels or other types of air interface channels.

An exemplary embodiment has been described above. Those skilled in the art will appreciate, however, that numerous variations from the embodiment described are possible while remaining within the scope and spirit of the invention as claimed.

We claim:

1. In a radio access network (RAN) in which, when the RAN seeks to transmit a message via an air interface to an access terminal served by the RAN, the RAN engages in a sequence of transmission attempts until the RAN completes the sequence or until the RAN receives an acknowledgement from the access terminal, each transmission attempt thus having an attempt number corresponding to a position of the transmission attempt in the sequence, the improvement comprising:

when the RAN is going to engage concurrently in at least a first transmission attempt of a first message and a second transmission attempt of a second message, (i) the RAN determining an attempt number of the first transmission attempt and an attempt number of the second transmission attempt, (ii) the RAN performing a comparison of the determined attempt numbers, and (iii) based at least in part on the comparison, a base station of the RAN allocating a quantity of transmission power among the first transmission attempt and the second transmission attempt, wherein the quantity of transmission power is an overall quantity of transmission power dedicated to at least one channel operating in a given wireless coverage area of the RAN, and wherein allocating the quantity of transmission power based at least in part on the comparison comprises (a) the RAN allocating more of the overall transmission power to the first transmission attempt than to the second transmission attempt if the attempt number of the first transmission attempt is greater than the attempt number of the second transmission attempt, (b) the RAN allocating less of the overall transmission power to the first transmission attempt than to the second transmission attempt if the attempt number of the first transmission attempt is less than the attempt number of the second transmission attempt, and (c) the RAN allocating an equal portion of the overall transmission power to the first and second transmission attempts when the attempt number of the first transmission attempt is equal to the attempt number of the second transmission attempt.

2. The improvement of claim 1, wherein the first and second messages are scheduled for a concurrent transmission attempt in a common time slot.

3. The improvement of claim 1, wherein the first message is assigned to a first channel and the second message is assigned to a second channel, wherein the first and second channels operate in a given wireless coverage area of the RAN, and wherein the first and second channels are forward link physical channels.

4. The improvement of claim 3, wherein the first and second channels both operate in one or both of (i) a given cell of the wireless coverage area and (ii) a given sector of the wireless coverage area.

5. The improvement of claim 1, wherein one or both of the determining and the performing are carried out by at least one entity selected from the group consisting of the base station, a base station controller (BSC), a mobile switching center (MSC), and a packet data gateway.

6. The improvement of claim 1,
wherein the attempt number of the first message includes first data indicative of the attempt number of the first transmission attempt;
wherein the first transmission attempt is indicative of a number of sequential attempts by the RAN to transmit the first message;

wherein the second message includes second data indicative of the attempt number of the second transmission attempt;

wherein the attempt number of the second transmission attempt is indicative of a number of sequential attempts by the RAN to transmit the second message;

wherein determining the attempt number of the first transmission attempt comprises parsing the first message to determine the attempt number of the first transmission attempt from the first data; and wherein determining the attempt number of second transmission attempt comprises parsing the second message to determine the attempt number of the second transmission attempt from the second data.

7. The improvement of claim 1, wherein the RAN determining the attempt number of the first transmission attempt and the attempt number of the second transmission attempt comprises querying stored data, wherein the stored data includes data indicative of the attempt number of the first transmission attempt and the attempt number of the second transmission attempt, wherein the attempt number of the first transmission attempt is indicative of a number of sequential attempts by the RAN to transmit the first message and the attempt number of the second transmission attempt is indicative of a number of sequential attempts by the RAN to transmit the second message.

8. The improvement of claim 1, wherein the transmission attempt of the first message is assigned to a first channel and the transmission attempt of the second message is assigned to a second channel, wherein the at least one channel operating in the given wireless coverage area includes the first and second channels.

9. In a radio access network (RAN) in which, when the RAN seeks to transmit a message via an air interface to an access terminal served by the RAN, the RAN engages in a sequence of transmission attempts until the RAN completes the sequence or until the RAN receives an acknowledgement from the access terminal, each transmission attempt thus having an attempt number corresponding to a position of the transmission attempt in the sequence, the improvement comprising:

when the RAN is going to engage concurrently in at least a first transmission attempt of a first message and a second transmission attempt of a second message, (i) the RAN determining an attempt number of the first transmission attempt and an attempt number of the second transmission attempt, (ii) the RAN performing a comparison of the determined attempt numbers, and (iii) based at least in part on the comparison, a base station of the RAN allocating a quantity of transmission power among the first transmission attempt and the second transmission attempt, wherein the quantity of transmission power is an overall quantity of transmission power dedicated to at least one channel operating in a given wireless coverage area of the RAN, wherein the transmission attempt of the first message is assigned to a first channel and the transmission attempt of the second message is assigned to a second channel, wherein the at least one channel operating in the given wireless coverage area includes the first and second channels, and wherein allocating the quantity of transmission power based at least in part on the comparison comprises (a) the RAN allocating more of the overall transmission power to the first channel than to the second channel if the attempt number of the first transmission attempt is greater than the attempt number of the second transmission attempt, (b) the RAN allocating less of the overall transmission power to the first channel than to the second channel if the attempt number of the first transmission attempt is less than the attempt number of the second transmission attempt, and (c) the RAN allocating an equal portion of the overall transmission power to the first and second channels if the attempt number of the first transmission attempt is equal to the attempt number of the second transmission attempt.

10. In a radio access network (RAN) in which, when the RAN seeks to transmit a message via an air interface to an access terminal served by the RAN, the RAN engages in a sequence of transmission attempts until the RAN receives an acknowledgement from the access terminal, each transmission attempt thus having an attempt number corresponding to a position of the transmission attempt in the sequence, a method comprising:

the RAN encountering a situation where the RAN is going to engage concurrently in at least a transmission attempt of a first message and a transmission attempt of a second message;

the RAN determining an attempt number of the first transmission attempt and an attempt number of the second transmission attempt;

the RAN performing a comparison of the determined attempt numbers; and the RAN allocating a quantity of transmission power among the first transmission attempt and the second transmission attempt based at least in part on the comparison, wherein the quantity of transmission power is an overall quantity of transmission power dedicated to at least one channel operating in a given wireless coverage area of the RAN, and wherein allocating the quantity of transmission power among the first transmission attempt and the second transmission attempt based at least in part on the comparison comprises (a) the RAN allocating more of the overall transmission power to the first channel than to the second channel if the attempt number of the first transmission attempt is greater than the attempt number of the second transmission attempt, (b) the RAN allocating less of the overall transmission power to first channel than to the second channel if the attempt number of the first transmission attempt is less than the attempt number of the second transmission attempt, and (c) the RAN allocating an equal portion of the overall transmission power to the first and second channels if the attempt number of the first transmission attempt is equal to the attempt number of the second transmission attempt.

11. The method of claim 10, wherein the RAN encountering a situation where the RAN is going to engage concurrently in at least a transmission attempt of a first message and a transmission attempt of a second message comprises the RAN determining that a base station is scheduled for a concurrent transmission attempt of the first message on a first channel and the second message on a second channel, wherein the first and second channels operate in a common time slot.

12. The method of claim 11, wherein the first and second channels operate in a given wireless coverage area of the RAN, and wherein the first and second channels are forward link physical channels.

13. The method of claim 12, wherein the first and second channels both operate in one or both of (i) a given cell of the wireless coverage area and (ii) a given sector of the wireless coverage area.

14. The method of claim 10, wherein one or more of the encountering, determining, performing, and allocating are carried out by at least one entity selected from the group consisting of a base station, a base station controller (BSC), a mobile switching center (MSC), and a packet data gateway.

15. The method of claim 10, further comprising:
   the RAN engaging in the transmission attempts at power levels according to the allocating.

\* \* \* \* \*